United States Patent
Lin

(10) Patent No.: US 7,055,751 B2
(45) Date of Patent: Jun. 6, 2006

(54) EXTENSION PIECE FOR LENGTH-REDUCED MEMORY CARD

(75) Inventor: Hsien-Teng Lin, Taoyuan Hsien (TW)

(73) Assignee: Chong-IA Precision Industry Co. Ltd., Taoyuan Hsien (TW)

( * ) Notice: Subject to any disclaimer, the term of this patent is extended or adjusted under 35 U.S.C. 154(b) by 0 days.

(21) Appl. No.: 10/915,525

(22) Filed: Aug. 9, 2004

(65) Prior Publication Data

US 2006/0027664 A1 Feb. 9, 2006

(51) Int. Cl.
*G06K 19/00* (2006.01)
*G06K 19/06* (2006.01)

(52) U.S. Cl. ...................................... 235/487; 235/492

(58) Field of Classification Search ................ 235/379, 235/441, 487, 492, 486; 361/737, 783; 439/638
See application file for complete search history.

(56) References Cited

U.S. PATENT DOCUMENTS

| | | | |
|---|---|---|---|
| 6,858,925 B1 * | 2/2005 | Wada et al. ................. | 257/679 |
| 2005/0007745 A1 * | 1/2005 | Gochnour et al. .......... | 361/737 |

* cited by examiner

*Primary Examiner*—Thien M. Le
*Assistant Examiner*—April A. Taylor
(74) *Attorney, Agent, or Firm*—Pro-Techtor Int'l Services

(57) ABSTRACT

An extension piece for length-reduced memory card includes a base and a case assembled to and covering an outer surface of the base. The case is provided below two lateral sides with two inward open-sided guide channels, front ends of which are adapted to receive two rear corners a length-reduced memory card, and at a top with a retaining structure for releasably engaging with a retaining slot provided at a rear end of the memory card. The extension piece firmly connected to the rear end of the memory card extends the length of the memory card to match the size of an existing card slot on a card reading apparatus, so that the length-reduced memory card could still be conveniently inserted into and moved out of the card slot.

2 Claims, 5 Drawing Sheets

EXTENSION PIECE FOR LENGTH-REDUCED MEMORY CARD

FIELD OF THE INVENTION

The present invention relates to an extension piece for connecting to a rear end of a length-reduced memory card, so that the length of the memory card is extended to match the size of an existing card slot on a card reading apparatus.

BACKGROUND OF THE INVENTION

A memory card, such as a multi-media card (MMC) is used to store data for a card reading apparatus, such as a digital camera, a smart phone, or an MP3, to read or write data from or into the memory card.

The card reading apparatus is provided with at least one card slot, which has a fixed size for a matching memory card to insert thereinto. In other words, a memory card must have a size matching that of the card slot to be inserted into the card slot.

There are many new memory cards constantly developed to have reduced sizes. For instance, an MMC card 1 as shown in FIG. 1 is initially designed to have a size as small as a postage stamp. And now, a new version of MMC card 2 has been developed to have a size only about one half of a postage stamp. The length-reduced MMC card 2 has gradually replaced the old MMC card 1 and plays an important role in the memory card market. To read or write the length-reduced memory card 2, it is necessary to insert the memory card 2 into a card slot having a size matching that of the memory card 2. That is, there must be a card reading apparatus that has a card slot with a size matching that of the length-reduced memory card 2 to enable reading and writing of the length-reduced memory card 2. The length-reduced memory card 2 inserted in a card slot on an old card reading apparatus could not be easily removed therefrom or would even become unusable.

A common way to solve this problem is to purchase a new card reading apparatus that has a card slot matching the size of the length-reduced memory card 2. However, most card reading apparatus are expensive and it is apparently a burden for the user to purchase a new one. Moreover, general card reading apparatus are designed to have an extended usable life, and it is not economical to arbitrarily discard the old card reading apparatus.

The concept of memory card adapter has also been employed to connect the length-reduced memory card 2 to an old card slot. That is, the memory card adapter is provided at an end with a plug for inserting into the card slot of an old card reading apparatus, and at the other end with a card slot matching the length-reduced memory card 2. However, since the card slot on the card reading apparatus has only very limited space, it is not suitable for the memory card adapted to plug therein. Besides, the memory card adapter has complicate structure that requires increased time and labor to manufacture. And, it is also very inconvenient to connect the memory card to the card reading apparatus via an adapter.

SUMMARY OF THE INVENTION

It is therefore a primary object of the present invention to provide an extension piece for connecting to a rear end of a length-reduced memory card, so as to extend the length of the memory card to match the size of an existing card slot on a card reading apparatus, allowing the length-reduced memory card to be read or written using the existing card reading apparatus.

To achieve the above and other objects, the extension piece for length-reduced memory card according to the present invention includes a base and a case assembled to and covering an outer surface of the base. The case is provided at two lateral sides with two inward open-sided guide channels, front ends of which are adapted to receive two rear corners a length-reduced memory card, and at a top with a retaining structure for releasably engaging with a retaining slot provided at a rear end of the memory card. The extension piece firmly connected to the rear end of the memory card extends the length of the memory card to match the size of an existing card slot on a card reading apparatus, so that the memory card could still be conveniently inserted into and moved out of the card slot.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
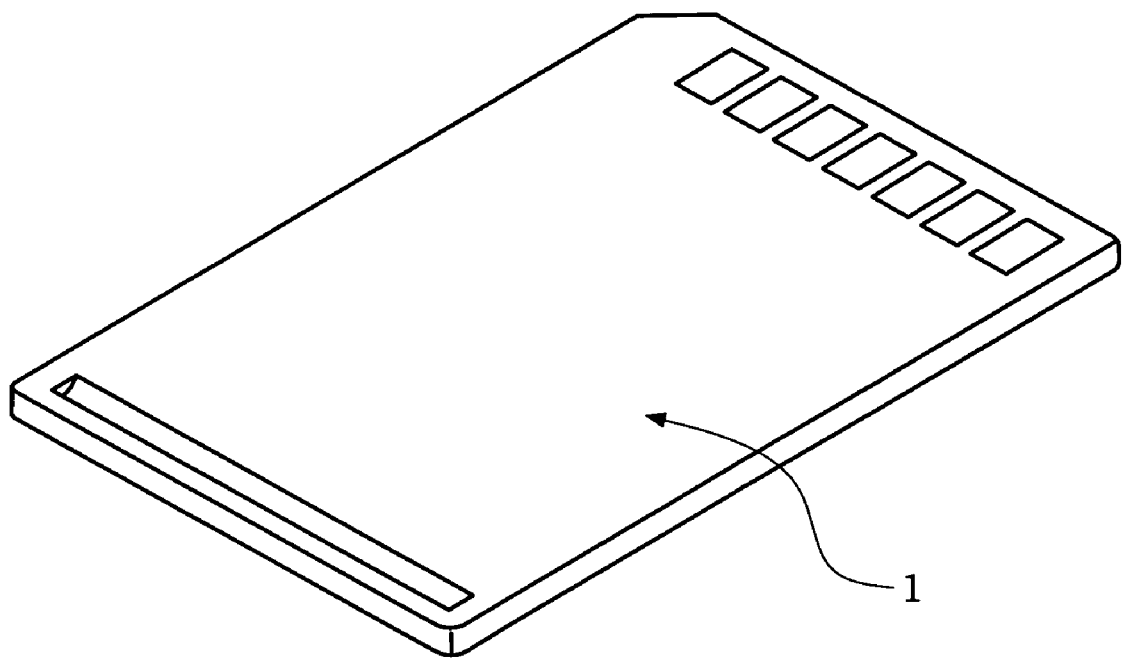
FIG. 1 is a perspective view of a conventional memory card.
Figure 2:
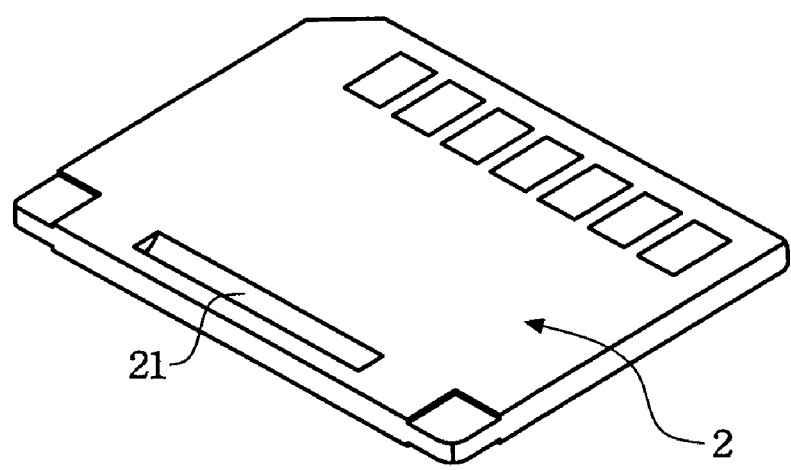
FIG. 2 is a perspective view of a length-reduced memory card.
Figure 3:
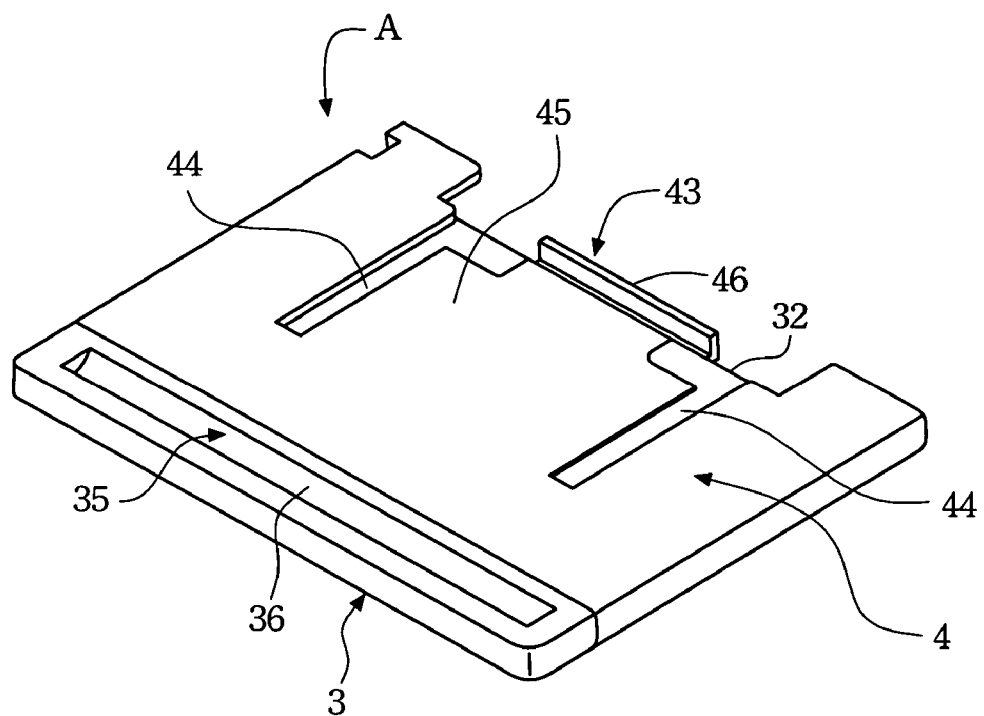
FIG. 3 is a top perspective view of an extension piece for length-reduced memory card according to the present invention.
Figure 4:
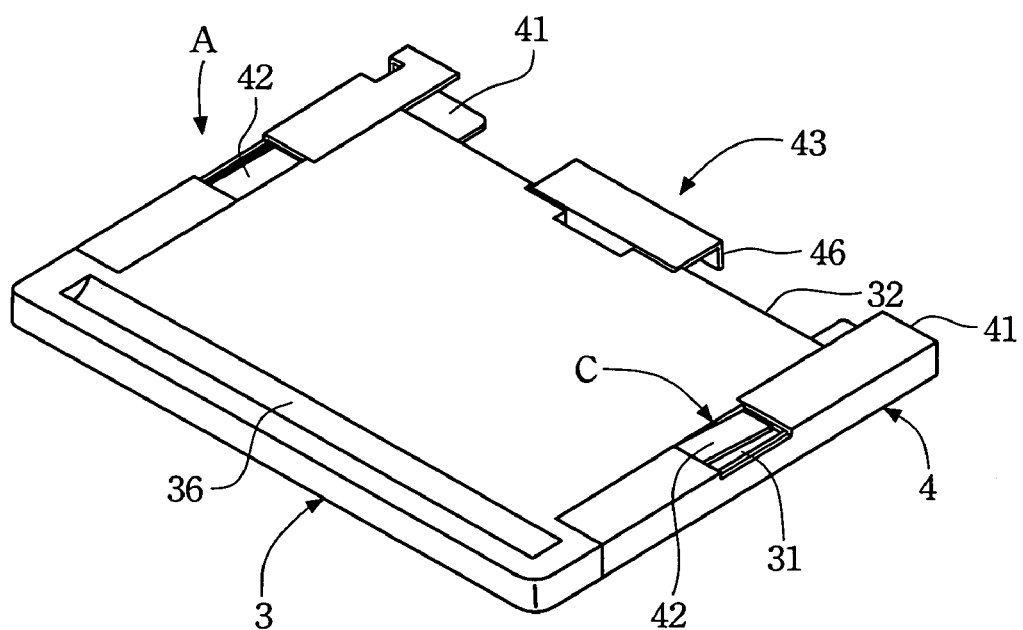
FIG. 4 is a bottom perspective view of FIG. 3.
Figure 5:
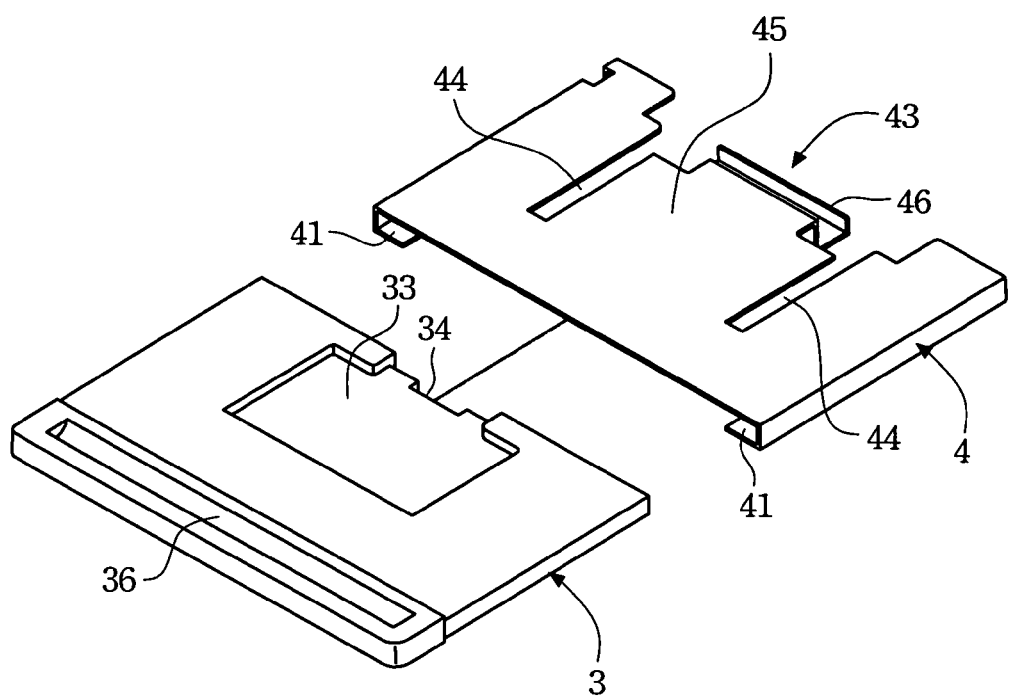
FIG. 5 is an exploded perspective view of FIG. 3.
Figure 6:
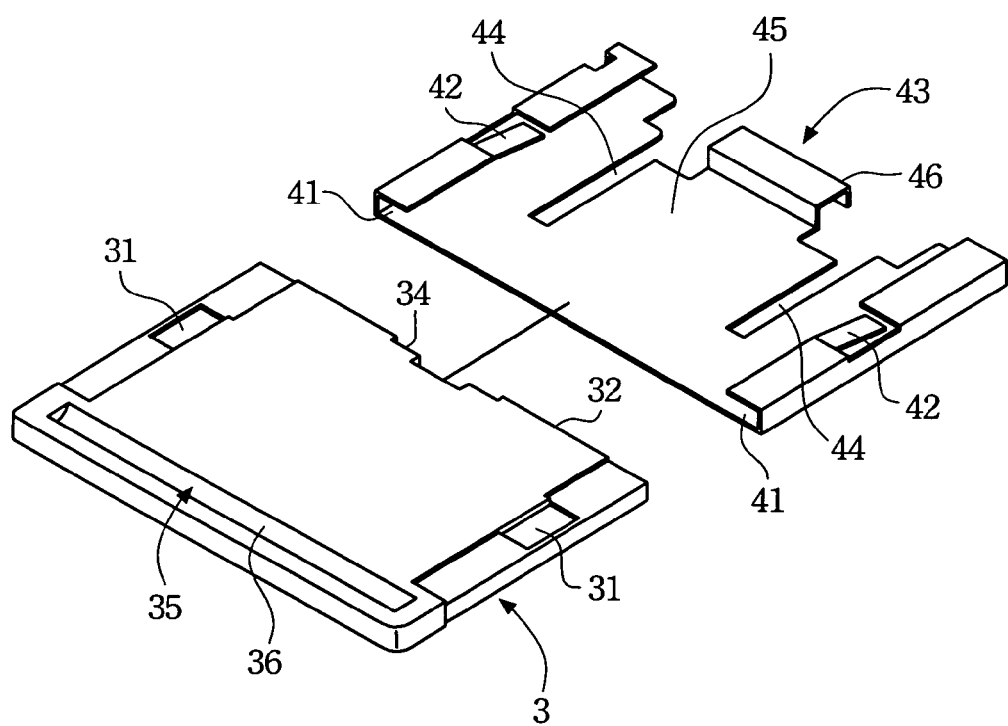
FIG. 6 is an exploded perspective view of FIG. 4.

Please refer to FIGS. 3 and 5 that are assembled and exploded top perspective views, respectively, of an extension piece for length-reduced memory card A according to a preferred embodiment of the present invention, and to FIGS. 4 and 6 that are assembled and exploded bottom perspective views, respectively, of the extension piece A. As shown, the extension piece A mainly includes a base 3 and a case 4.

The base 3 is made of, for example, a plastic material, and the case 4 is made of, for example, a metal material for assembling to and covering an outer surface of the base 3.

The case 4 and the base 3 are assembled together via an irreversible connection structure c. A feasible example of the irreversible connection structure c includes two inward open-sided guide channels 4 1 formed below two lateral sides of the case 4, an oblique plate 42 forward extended from a predetermined point on a bottom of each guide channel 41 toward a top of the case 4, and a recess 31 provided at each lower lateral side of the base 3 corresponding to the position of the oblique plate 42 on the case 4. The base 3 and the case 4 are assembled together by way of guiding two lateral sides of the base 3 into the two guide channels 41 of the case 4 from a rear end of the case 4, so that the oblique plates 42 are located in the recesses 31 while extending forward to abut against front edges of the recesses 31. In this manner, the base 3 is firmly assembled to the case 4 and prevented by the oblique plates 42 from moving backward to separate from the case 4.

The case 4 is formed at the top with a retaining structure 43, which includes an elongated cut 44 provided near each lateral side of the case 4 to rearward extend from a front end of the case 4 by a predetermined length, an elastic plate 45 formed on the top of the case 4 between the two elongated cuts 44, and a hook portion 46 formed at a front end of the elastic plate 45 to forward project from a front end 32 of the base 3. The hook portion 46 of the retaining structure 43 is adapted for hooking to a retaining slot 21 provided at a rear end of a length-reduced memory card 2.

Figure 8:
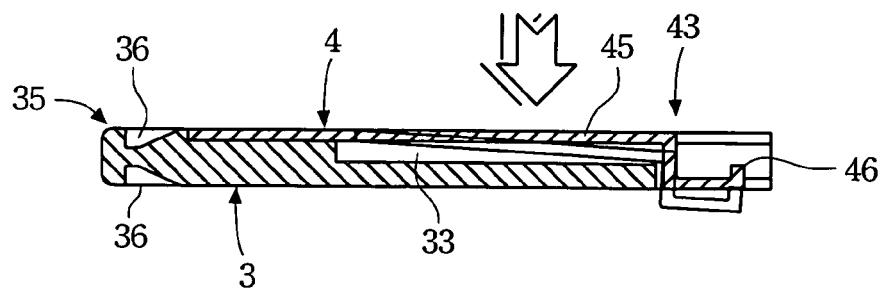
FIG. 8 is a sectioned side view of FIG. 7.

The base 3 is provided at a top with a flat recess 33 corresponding to the elastic plate 45 of the case 4. A front edge of the recess 33 is provided with a transverse dent 34 corresponding to the hook portion 46. When it is desired to release the hook portion 46 from the retaining slot 21 of the length-reduced memory card 2 by way of depressing the elastic plate 45, the flat recess 33 provides a room for the elastic plate 45 to elastically move downward, as shown in FIG. 8.

Figure 7:
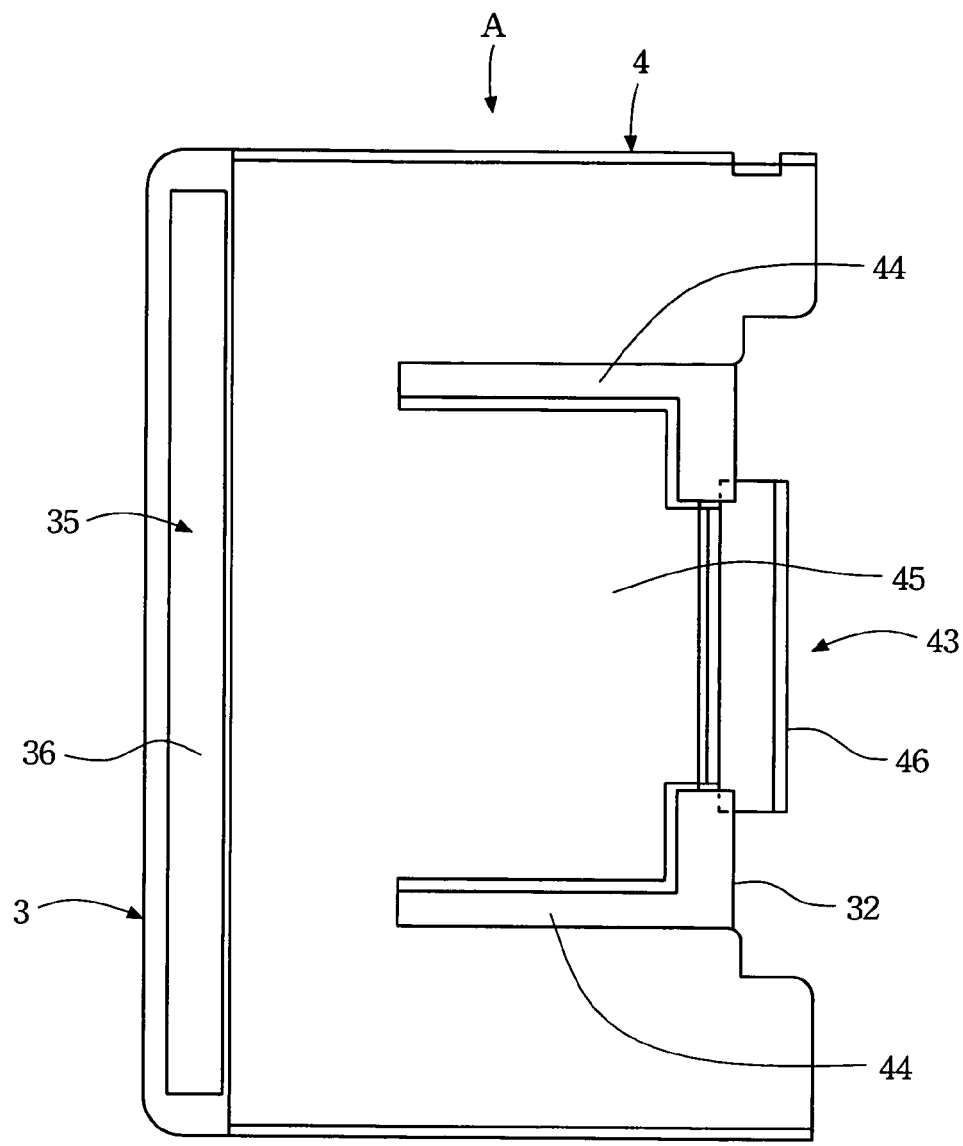
FIG. 7 is a top plan view of the extension piece for length-reduced memory card of FIG. 3.
Figure 9:
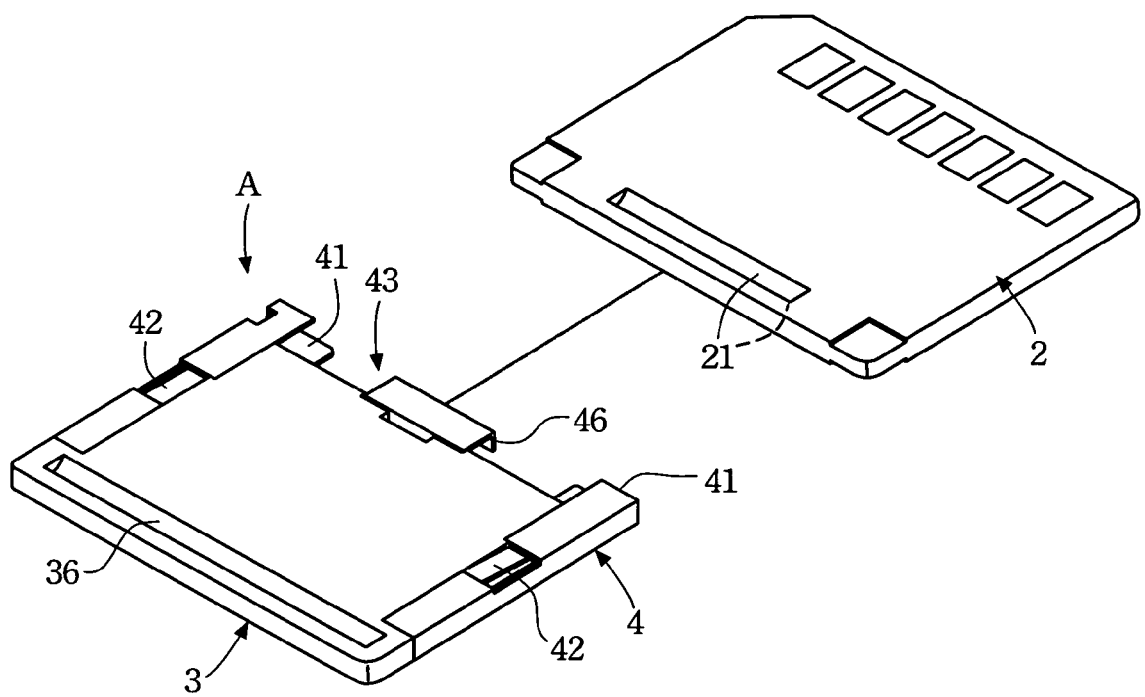
FIG. 9 is a bottom perspective view showing the extension piece of FIG. 4 and a length-reduced memory card before being assembled together.
Figure 10:
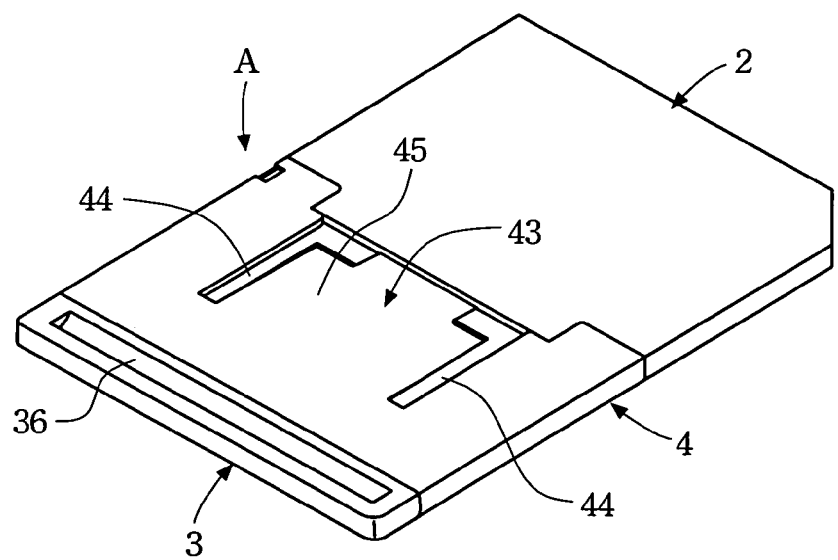
FIG. 10 is a top perspective view showing the extension piece of FIG. 3 and a length-reduced memory card having being assembled together.

As can be seen from a top plan view of the extension piece A shown in FIG. 7, front ends of the two guide channels 41 of the case 4 are forward projected from the front end 32 of the base 3 by a predetermined length. When it is desired to extend (enlarge) a lengthwise size of the length-reduced memory card 2, simply insert two rear corners of the memory card 2 into the front ends of the guide channels 41 on the case 4, as shown in FIG. 9. At this point, the hook portion 46 at the front end of the elastic plate 45 of the retaining structure 43 automatically engages with the retaining slot 21 at the rear end of the memory card 2, so that the extension piece A formed from the base 3 and the case 4 is firmly associated with the memory card 2 to form a unit and extends the length of the memory card 2 from a rear end thereof, as shown in FIG. 10. With the extension piece A connected to the rear end of the memory card 2, the length-reduced memory card 2 could be conveniently inserted at a front end into an existing card slot (not shown) on a card reading apparatus.

When it is desired to separate the extension piece A from the length-reduced memory card 2, simply depress the elastic plate 45 to release the hook portion 46 at the front edge of the elastic plate 45 from the retaining slot 21 of the memory card 2, and the memory card 2 could be easily removed from the extension piece A.

To facilitate easy removal of the extension piece A and the associated memory card 2 from the card slot of the card reading apparatus, the base 3 is provided at a rear end with an anti-slipping structure 35, which may be, for example, a groove 36 provided on at least an upper rear or a lower rear surface of the base 3.

The present invention has been described with a preferred embodiment thereof and it is understood that many changes and modifications in the described embodiment can be carried out without departing from the scope and the spirit of the invention that is intended to be limited only by the appended claims.

The invention claimed is:

1. An extension piece for a length-reduced memory card which extends a length-reduced memory card to a length matching a size of an existing card slot on a card reading apparatus, comprising:

a base; and a case assembled to and covering an outer surface of said base; said case being provided below two lateral sides with two inward open-sided guide channels, front ends of said two guide channels receive two rear corners of said length-reduced memory card, and said case being provided at a top with a retaining structure for hooking to a retaining slot provided at a rear end of said length-reduced memory card;

wherein said retaining structure includes an elongated cut provided near each lateral side of said case to rearward extend from a front end of the case by a predetermined length, an elastic plate formed on the top of said case between said two elongated cuts, and a hook portion formed at a front end of said elastic plate to forward project from a front end of said base: and said hook portion of said retaining structure hooks to said retaining slot provided at the rear end of said length-reduced memory card; and wherein said case and said base are firmly assembled together via an irreversible connection structure; and further wherein said irreversible connection structure includes said two inward open-sided guide channels formed below two lateral sides of said case, an oblique plate forward extended from a predetermined point on a bottom of each said guide channel toward the top of said case, and a recess provided at each lower lateral side of said base corresponding to the position of said oblique plate on said case; whereby when said base and said case are assembled together by way of guiding two lateral sides of said base into said two guide channels of said case from a rear end of said case, said oblique plates are located in said recesses at two lower lateral sides of said base while extending forward to abut against front edges of said recesses, preventing said base assembled to said case from moving backward to separate from said case.

2. An extension piece for length-reduced memory card which extends a length-reduced memory card to a length matching a size of an existing card slot on a card reading apparatus, comprising: a base; and a case assembled to and covering an outer surface of said base; said case being provided below two lateral sides with two inward open-sided guide channels, front ends of said two guide channels receive two rear corners of said length-reduced memory card, and said case being provided at a top with a retaining structure for hooking to a retaining slot provided at a rear end of said length-reduced memory card; wherein aid base is provided at a top with a flat recess corresponding to said elastic plate of said case, and a front edge of said flat recess being provided with a transverse dent corresponding to said hook portion on said case;

wherein said case and said base are firmly assembled together via an irreversible connection structure; and wherein said irreversible connection structure includes said two inward open-sided guide channels formed below two lateral sides of said case, an oblique plate forward extended from a predetermined point on a bottom of each said guide channel toward the top of said case, and a recess provided at each lower lateral side of said base corresponding to the position of said oblique plate on said case; whereby when said base and said case are assembled together by way of guiding two lateral sides of said base into said two guide channels of said case from a rear end of said case, said oblique plates are located in said recesses at two lower lateral sides of said base while extending forward to abut against front edges of said recesses, preventing said base assembled to said case from moving backward to separate from said case.

* * * * *